(12) United States Patent
Imayama et al.

(10) Patent No.: US 6,512,869 B1
(45) Date of Patent: Jan. 28, 2003

(54) OPTICAL CABLE

(75) Inventors: Takafumi Imayama, Kanagawa (JP); Masayoshi Yamamo, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 194 days.

(21) Appl. No.: 09/615,909

(22) Filed: Jul. 13, 2000

(30) Foreign Application Priority Data

Jul. 19, 1999 (JP) ............................................. 11-204177

(51) Int. Cl.[7] ................................................. G02B 6/44
(52) U.S. Cl. ........................................................ 385/114
(58) Field of Search ................................. 385/114, 110

(56) References Cited

U.S. PATENT DOCUMENTS

| 4,105,284 A | * | 8/1978 | Olshansky | |
|---|---|---|---|---|
| 4,176,910 A | * | 12/1979 | Noethe | |
| 4,828,349 A | * | 5/1989 | Nakasuji | |
| 4,953,945 A | * | 9/1990 | Nishimura et al. | |
| 5,809,195 A | * | 9/1998 | Brown et al. | 385/114 |
| 5,905,835 A | * | 5/1999 | Bourghelle et al. | 385/114 |
| 6,222,969 B1 | * | 4/2001 | Botelho et al. | 385/114 |
| 6,269,210 B1 | * | 7/2001 | Yagi et al. | 384/114 |
| 6,334,016 B1 | * | 12/2001 | Greer, IV | 385/114 |
| 6,370,305 B2 | * | 4/2002 | Lochkovic et al. | 385/114 |

FOREIGN PATENT DOCUMENTS

JP 8-262284 10/1996

* cited by examiner

*Primary Examiner*—Neil Abrams
(74) *Attorney, Agent, or Firm*—McDermott, Will & Emery

(57) ABSTRACT

A flat type optical cable is composed of a plurality of optical fiber cords, each including an optical fiber coated with a cord jacket, which are parallel arranged; and a cable jacket which directly coats the cord jackets so that the optical fiber cords are integrated into one optical cable. In the flat type optical cable, the Young's modulus of a coating material forming the cable jacket is lower than the Young's modulus of a coating material forming the cord jacket. Particularly preferably, the Young's modulus of the coating material for forming the cord jacket is in a range of from 9 kg/mm$^2$ to 15 kg/mm$^2$ whereas the Young's modulus of the coating material for forming the cable jacket is in a range of from 4 kg/mm$^2$ to 9 kg/mm$^2$.

8 Claims, 4 Drawing Sheets

OPTICAL CABLE

BACKGROUND OF THE INVENTION

1. Field of the Invention

The present invention relates to a flat type optical cable which is integrated by coating a plastic coating layer on parallel arranged optical-fiber cords, particularly relates to a flat type optical cable which is easily subjected to terminal treatment.

2. Description of the Related Art

A flat type optical cable having such a cross-sectional structure as shown in FIG. 2 is heretofore mainly used for indoor wiring. The revealing work for taking optical-fiber cords out of the optical cable by removing a part of an outer coating (hereinafter referred to as cable jacket) at an end portion of the optical cable is required when a connector for connecting the optical cable to an apparatus is to be attached to a terminal of the optical cable or when the optical cable is to be connected to another optical cable.

Specifically in this revealing work, first, the flat type optical cable is cut longitudinally by about 10 mm by means of a nipper from above the cable jacket along the respective optical-fiber cords in the inside of the flat type optical cable at the end portion thereof. The thus cut pieces of the cable jacket are picked by fingers and pulled in mutually opposite directions so as to be torn by a predetermined length. Thus, the respective optical-fiber cords in the inside of the optical cable are exposed.

Incidentally, after revealing has been performed for exposing the optical-fiber cords at the end portion, the cut portions of the cable jacket are removed. Then, a connector is attached to the optical cable so that the optical cable is connected to an optical apparatus, another optical cable, or the like.

FIGS. 1 and 3 show examples of the state in which revealing was performed on an end portion of a flat type optical cable. FIG. 1 shows a desirable example in which respective optical fiber cords could be taken out without any injury of the cord jacket. FIG. 3 shows an undesirable example in which respective optical fibers in the inside of the optical-fiber cords were exposed because the cord jackets as well as the cable jacket were torn out.

Incidentally, a flat type optical cable is generally constituted by from one to about five optical fiber cords. A flat type optical cable is mainly used indoors and shaped like a flat plate in cross-sectional view in order to facilitate the work of laying or wiring along wall or floor surfaces.

Each of the optical-fiber cords contained in the flat type optical cable has an optical-fiber core or a bare optical fiber 1, an aramid fibrous layer 2 (for example, trade name: Kevlar) longitudinally attached onto the optical-fiber core or the bare optical fiber 1, and an outermost layer 3 of plastics such as polyethylene or polyvinyl chloride with which the fibrous layer 2 is coated.

JP-A-8-262284 shows the general technical level of such a flat type optical cable. This publication discloses that the toughness of the optical-fiber cords can be secured while the flexibility of the optical cable as a whole can be secured when the hardness of the cord jackets is set to be in a range of from 40 degrees to 60 degrees in terms of Shore durometer hardness and the hardness of the cable jacket is set to be in a range of from 20 degrees to 35 degrees in terms of Shore durometer hardness.

In the background art, however, as shown in FIG. 3, when the flat type optical cable is subjected to revealing, there is a possibility that the optical-fiber cords may be damaged because the outer coating (hereinafter referred to as cord jacket) of each of the optical-fiber cords as well as the cable jacket are torn out.

If there is such a damage, the revealing work is required to be tried again. As a result, the efficiency of the work is lowered, so that the laying cost increases as well as the laying term is elongated.

SUMMARY OF THE INVNETION

It is an object of the present invention to provide a flat type optical cable in which it is possible to take optical-fiber cords out at an end portion of a flat type optical cable without any damage of the optical-fiber cords to thereby improve efficiency in the work of treating a terminal of the flat type optical cable.

The present invention provides a flat type optical cable comprising a plurality of optical fiber cords, each including an optical fiber coated with a cord jacket, which are parallel arranged in a plane, and a cable jacket which directly extrusion-coats the plurality of optical fiber cords so that the optical fiber cords are integrated; wherein the Young's modulus of a coating material forming the cable jacket is lower than the Young's modulus of a coating material forming the cord jacket.

This is because, if the strength characteristics of the cord jackets and the cable jacket are selected as described above, the cord jackets are high in Young's modulus and hardly expand so that the cable jacket is easily peeled and separated from the cord jackets when the cable jacket at an end portion of the optical cable is pulled for the revealing work.

Even if there is a region in which the cable jacket is partially fusion-bonded to the cord jackets, the cord jackets of the optical-fiber cords are prevented from being deformed or damaged because the cable jacket in this region expands more greatly than the cord jackets so that the cable jacket is broken and separated from the cord jackets.

The present invention is particularly adapted to the flat type optical cable in which the Young's modulus of the coating material forming the cord jacket is in a range of from 9 kg/mm$^2$ to 15 kg/mm$^2$ whereas the Young's modulus of the coating material forming the cable jacket is in a range of from 4 kg/mm$^2$ to 9 kg/mm$^2$.

Further, the present invention provides the flat type optical cable in which the extrusion coating temperature for the cable jacket is lower by at least 10° C. than the extrusion coating temperature for the cord jacket.

This is because, if a combination of materials having the aforementioned relation is selected in terms of extrusion coating temperature characteristics of plastic materials for the cord jackets and the cable jacket, the cable jacket can be formed by extrusion coating at a lower temperature than the cord jackets and fusing of the cord jackets with the cable jacket hardly occurs when the cable jacket is formed on the cord jackets of the optical-fiber cords by extrusion coating.

Incidentally, the extrusion temperature can be originally selected to be in a considerably wide temperature range. In the present invention, however, a temperature obtained by a melt-flow test which will be described later as a test for specifying an optimum extrusion temperature for each of plastic materials of the cord jackets and the cable jacket is defined as the extrusion temperature, so that extrusion coating is performed at this temperature.

Further, the present invention provides the flat type optical cable in which: the Shore durometer hardness of the cord jacket is higher than that of the cable jacket; and the Shore durometer hardness of the cable jacket is in a range of from 40 degrees to 60 degrees.

Hardness and surface smoothness are substantially different concepts from each other. Generally in the case of a plastic material, the extrusion-molded surface becomes denser and smoother in terms of surface roughness as the hardness becomes higher. Accordingly, when a plastic material high in hardness is selected as the coating material for the cord jackets, the surfaces of the cord jackets are smoothed. Hence, even if there is an unevenness in the surfaces of the cord jackets when the cable jacket is formed on the cord jackets by extrusion coating, each recess in the unevenness is so small that a molten resin hardly enters the recess. As a result, the cable jacket is hardly bonded to the cord jackets, so that the cable jacket is easily separated from the cord jackets when revealing is performed.

PREFERRED EMBODIMENTS OF THE INVENTION

An embodiment of the present invention will be described below with reference to FIGS. 1 and 2 and Table 1. Incidentally, like parts are referenced correspondingly for omission of duplicated description.
(Structure of Optical Cable)

Figure 2:
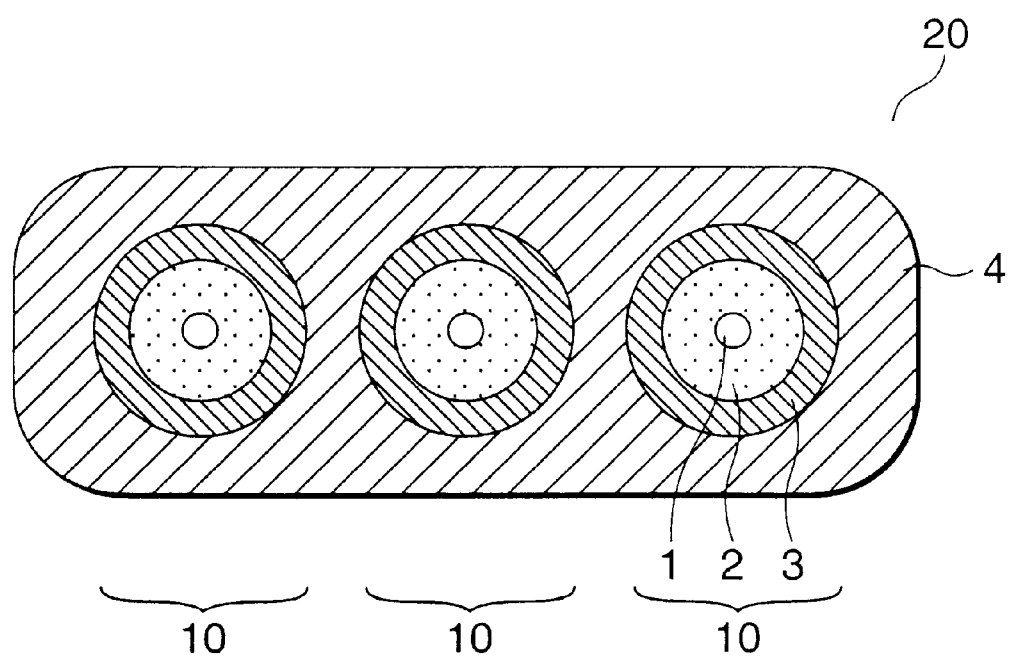
FIG. 2 is a cross-sectional view showing the structure of a flat type optical cable as a subject of the present invention.

FIG. 2 shows a cross-sectional structure of a flat type optical cable as a subject of an embodiment of the present invention.

The reference numeral 20 designates a flat type optical cable. The flat type optical cable 20 is generally produced in a manner such that, generally, two to about five optical-fiber cords 10, which are parallel arranged in a plane, are extrusion-coated with plastics into a flat plate like shape having a width in a range of from about 3 mm to about 15 mm and a thickness in a range of from about 2 mm to about 5 mm in cross-sectional view.

Incidentally, the present invention can be carried out even in the case where the flat type optical cable 20 is constituted by a single optical-fiber cord 10.

Each of the optical-fiber cords 10 is formed such that an aramid fibrous layer 2 (for example, trade name: Kevlar) is longitudinally attached onto the optical-fiber core or the bare optical fiber 1, and plastics such as polyethylene or polyvinyl chloride is applied to cover the fibrous layer 2 so that the optical-fiber cord 10 has an outer diameter in a range of 1.5 mm to 3 mm.

Figure 4:
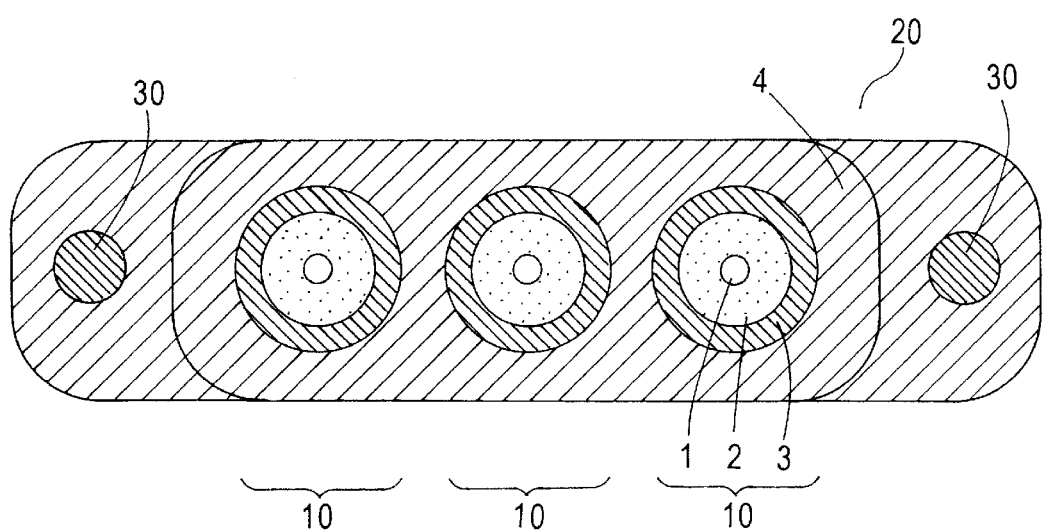
FIG. 4 is a cable structure in accord with the invention including a tensile wire.

Although FIG. 2 shows the case where the flat type optical cable 20 does not include any tensile wire, the effect of the present invention can be achieved also in the case where a flat type optical cable is configured to have steel wire 30 with an outer diameter in a range of from about 0.2 mm to about 0.5 mm, as shown in FIG. 4.

Plastics such as low-density polyethylene or polyvinyl chloride may be used as plastic materials for the cord jackets and the cable jacket. Such plastics may contain a compounding agent such as a fire retardant, a plasticizer, etc.
(Relation between Cord Jacket and Cable Jacket)

For the aforementioned reason, the flat type optical cable according to the present invention needs to be formed so that the Young's modulus of the plastic material for forming the cable jacket is lower than that of the plastic material for forming the cord jackets.

As for the absolute values of the Young's moduli of these plastic materials, it is especially preferable from the point of view of easy handling, etc. that the Young's modulus of the material for forming the cord jackets is in a range of from 9 $kg/mm^2$ to 15 $kg/mm^2$ and the Young's modulus of the material for forming the cable jacket is in a range of from 4 $kg/mm^2$ to 9 $kg/mm^2$ as will be described later in the description of examples.

Further, in the flat type optical cable according to the present invention, it is more preferable for the aforementioned reason that a combination of plastic materials is selected so that the extrusion coating temperature of the cable jacket is lower than that of the cord jackets.

Further, in the flat type optical cable according to the present invention, it is more preferable for the aforementioned reason that a combination of plastic materials is selected so that the hardness of the cord jackets is higher than that of the cable jacket, and that the hardness of the cable jacket is in a range of from 40 degrees to 60 degrees, both inclusively, in terms of Shore durometer hardness.

The reason why the hardness of the cable jacket is especially preferably in a range of from 40 degrees to 60 degrees in terms of Shore durometer hardness is that the softness of the flat type optical cable as a whole becomes moderate sufficient to make handling easy in the work of laying the flat type optical cable when the hardness of the cable jacket is in this range.

EXAMPLES
(Production of Flat Type Optical Cable)

The flat type optical cable as a subject of the embodiments of the present invention has a cross-sectional structure shown in FIG. 2 and is produced in such a manner that three optical-fiber cords 10 each having an outer diameter of 1.5 mm are arranged parallel on a plane and coated with low-density polyethylene to have a size of 7.8 mm wide and 2.6 mm thick.

Each of the optical-fiber cords 10 is produced in a manner such that a fibrous layer 2 of Kevlar is attached longitudinally onto an optical-fiber core 1 and low-density polyethylene is further applied onto the fibrous layer 2 to be an outer diameter of 1.5 mm.
(Revealing Test for Flat Type Optical Cable)

Flat type optical cables 20 each having the aforementioned size are produced by variously changing the combination of the two kinds of low-density polyethylene different both in Young's modulus and in extrusion coating temperature as the plastic materials for forming the cord jackets 3 and the cable jacket 4.

Each of the flat type optical cables 20 thus produced is subjected to revealing in order to expose optical fiber cords 10 at a terminal of the flat type optical cable.

A test for judging whether the optical-fiber cords 10 at the terminal of the flat type optical cable 20 can be exposed and taken out easily by the revealing work without any damage of the optical-fiber cords 10 is hereinafter called revealing test.

Figure 1:
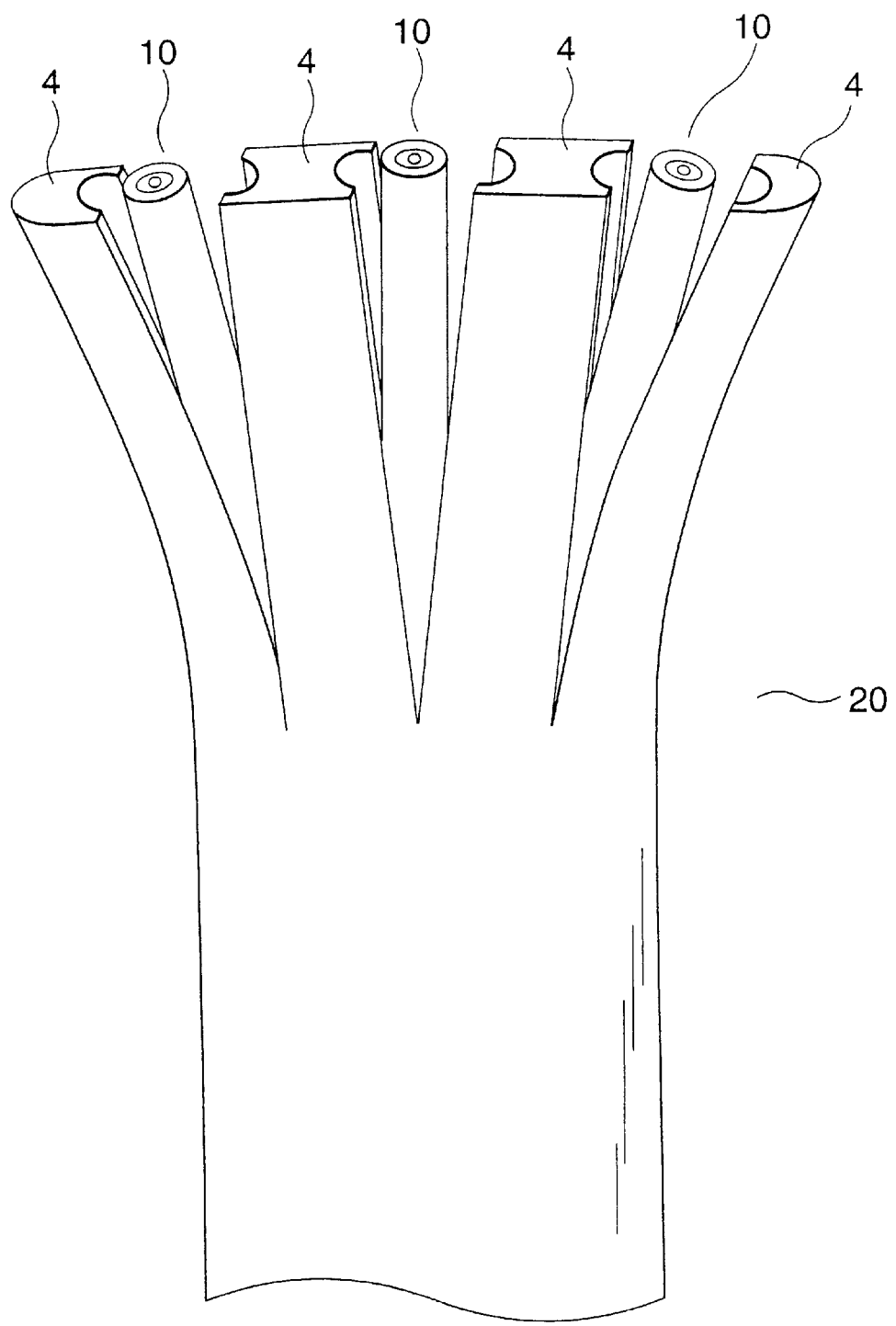
FIG. 1 is a perspective view showing a state in which revealing of optical-fiber cords has been made upon a flat type optical cable according to the present invention.

FIG. 1 shows an example of the state of the terminal of the flat type optical cable 20 after the revealing test. FIG. 1 shows the state in which the optical fiber cords 10 are revealed well without any damage of the cord jackets 3 of the optical-fiber cords 10 as described above.

Figure 3:
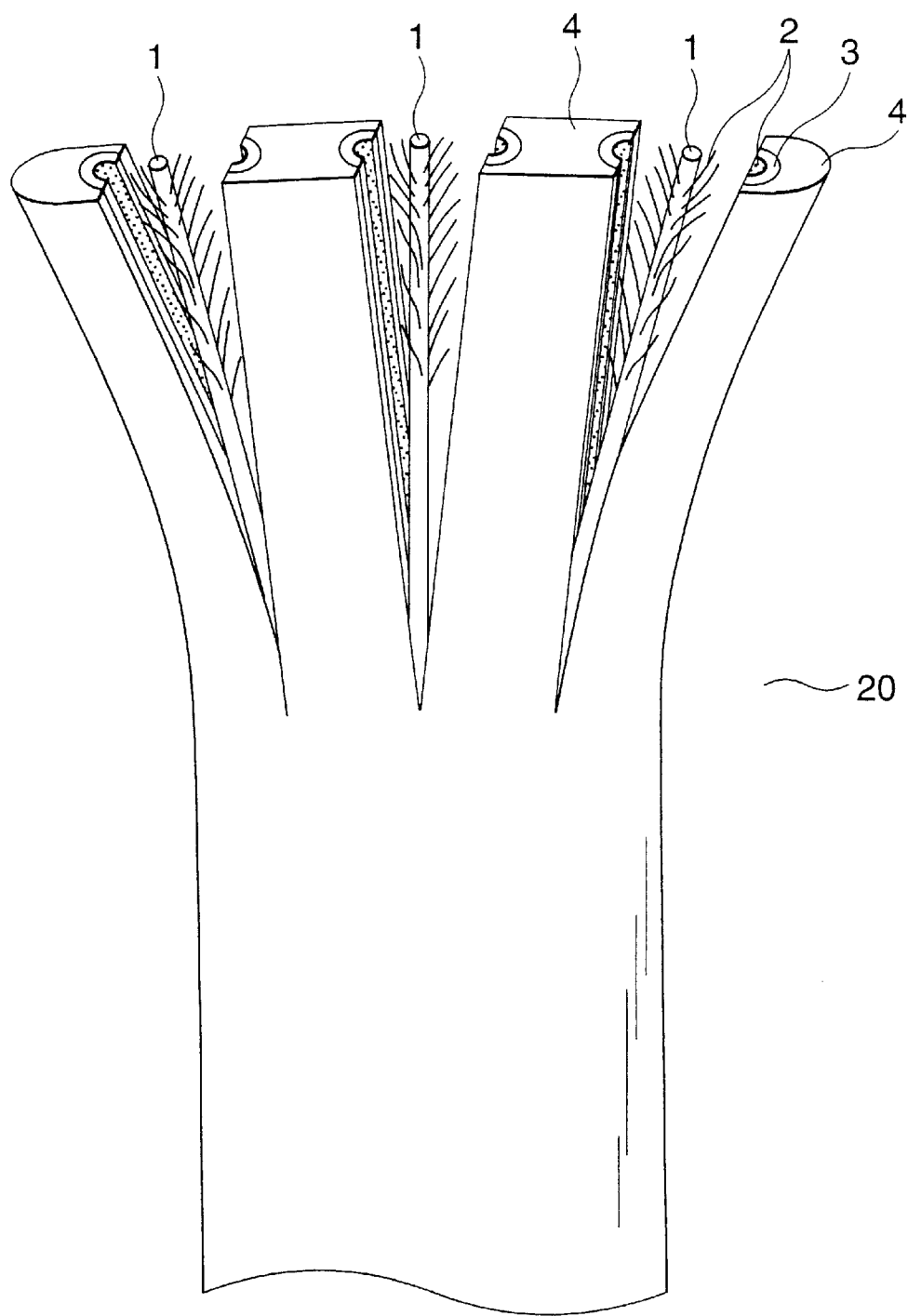
FIG. 3 is a perspective view showing a state in which revealing results in failure upon a conventional flat type optical cable.

Incidentally, FIG. 3 shows an example of the state in which the background-art flat type optical cable 20 is subjected to revealing work. In that state, the optical fiber core 1 and the fibrous layer 2 in the inside of each of the cord jackets 3 are separated from each other because the cable jacket 4 cannot be separated from each cord jacket 3 so that the cord jacket 3 is torn out.

Each of the flat type optical cables 20 produced was subjected to the revealing test, so that the relation between the combination of Young's moduli and extrusion coating temperatures of the cord jacket 3 and the cable jacket 4 and the easiness of revealing was made clear. Table 1 shows conditions for the revealing test. Table 2 shows results of the revealing test.

TABLE 1

Conditions for Revealing Test on Flat Type Optical Cable

| | Example | | | | Comparative Example | |
|---|---|---|---|---|---|---|
| No. | 1 | 2 | 3 | 4 | 1 | 2 |
| Cord Jacket | | | | | | |
| Young's Modulus (kg/mm$^2$) | 9 | 15 | 12 | 10 | 8 | 9 |
| Extrusion Coating Temperature (° C.) | 190 | 200 | 200 | 190 | 190 | 190 |
| Plastic Material | Low-density poly-ethylene | | | | | |
| Cable Jacket | | | | | | |
| Young's Modulus (kg/mm$^2$) | 4 | 9 | 9 | 9 | 9 | 15 |
| Extrusion Coating Temperature (° C.) | 170 | 180 | 190 | 180 | 190 | 200 |
| Plastic Material | Low-density poly-ethylene | | | | | |

TABLE 2

Results of Revealing Test on Flat Type Optical Cable

| | Example | | | | Comparative Example | |
|---|---|---|---|---|---|---|
| No. | 1 | 2 | 3 | 4 | 1 | 2 |
| Results of Revealing Test (N = 5) | The optical-fiber cords could be taken out easily without damage in all cases of five trials of the revealing test. | | | | The cord jackets were damaged in three trials among five trials of the revealing test. | The cord jackets were damaged in all cases of five trials of the revealing test. |

Each of Examples 1 to 4 in Table 1 shows the case where the flat type optical cable 20 was produced on the condition that the combination of coating materials was selected so that the Young's modulus of low-density polyethylene for forming the cable jacket 4 was smaller than that of low-density polyethylene for forming the cord jackets 3 and that the extrusion coating temperature of the former was lower than that of the latter.

The revealing test was tried five times upon each of the flat type optical cables 20 produced.

That is, Example 1 shows the case where a flat type optical cable 20 was produced while low-density polyethylene with a Young's modulus of 9 kg/mm$^2$ and an extrusion coating temperature of 190° C. was selected for the cord jackets 3 whereas low-density polyethylene with a Young's modulus of 4 kg/mm$^2$ and an extrusion coating temperature of 170° C. was selected for the cable jacket 4.

In this case, the optical-fiber cords 10 could be taken out through removal of the cable jacket 4 without any damage of the cord jackets 3 in all cases of five trials of the revealing test.

Example 2 shows the case where a flat type optical cable 20 was produced on the same condition as that in Example 1 except that low-density polyethylene with a Young's modulus of 15 kg/mm$^2$ as a larger value than 9 kg/mm$^2$ in Example 1 and an extrusion coating temperature of 200° C. as a higher value than 190° C. in Example 1 was selected for the cord jackets 3 whereas low-density polyethylene with a Young's modulus of 9 kg/mm$^2$ as a larger value than 4 kg/mm$^2$ in Example 1 and an extrusion coating temperature of 180° C. as a higher value than 170° C. in Example 1 was selected for the cable jacket 4.

Similarly to Example 1, the optical-fiber cords 10 could be revealed easily without any damage in all cases of five trials.

Example 3 shows the case where a flat type optical cable 20 was produced on the same condition as that in Example 1 except that low-density polyethylene with a Young's modulus of 12 kg/mm$^2$ as a larger value than 9 kg/mm$^2$ in Example 1 and an extrusion coating temperature of 200° C. as a higher value than 190° C. in Example 1 was selected for the cord jackets 3 whereas low-density polyethylene with a Young's modulus of 9 kg/mm$^2$ as a larger value than 4 kg/mm$^2$ in Example 1 and an extrusion coating temperature of 190° C. as a higher value than 170° C. in Example 1 was selected for the cable jacket 4.

Similarly to Example 1, the optical-fiber cords 10 could be revealed easily without any damage in all cases of five trials.

Example 4 shows the case where a flat type optical cable 20 was produced on the same condition as that in Example 1 except that low-density polyethylene with a Young's modulus of 10 kg/mm$^2$ as a larger value than 9 kg/mm$^2$ in Example 1 was selected for the cord jackets 3 whereas low-density polyethylene with a Young's modulus of 9 kg/mm$^2$ as a larger value than 4 kg/mm$^2$ in Example 1 and an extrusion coating temperature of 180° C. as a higher value than 170° C. in Example 1 was selected for the cable jacket 4.

Similarly to Example 1, the optical-fiber cords 10 could be revealed easily without any damage in all cases of five trials.

Each of comparative Examples 1 and 2 in Table 1 show the case where the flat type optical cable 20 was produced in the condition that plastic materials were selected so that the Young's modulus of low-density polyethylene for forming the cable jacket 4 was larger than that of low-density polyethylene for forming the cord jackets 3 and the extrusion coating temperature of the former was equal to or higher than that of the latter. Each of the flat type optical cables 20 was subjected to the revealing test.

That is, Comparative Example 1 shows the case where low-density polyethylene was selected so that the Young's modulus and extrusion coating temperature of the cord jackets 3 were 8 kg/mm$^2$ and 190° C. respectively whereas the Young's modulus of the cable jacket 4 was 9 kg/mm² and the extrusion coating temperature thereof was equal to 190° C.

In this case, the cord jackets 3 were torn out and damaged as shown in FIG. 3 in three cases among five revealing trials when an end portion of the cable jacket 4 was torn so that the optical-fiber cords were taken out.

Comparative Example 2 shows the case where low-density polyethylene was selected so that the Young's modulus and extrusion coating temperature of the cord jackets 3 were 9 kg/mm² and 190° C. respectively whereas the Young's modulus and extrusion coating temperature of the cable jacket 4 were 15 kg/mm² and 200° C. respectively.

In this case, the cord jackets 3 were torn out and damaged as shown in FIG. 3 in all cases of five revealing trials when an end portion of the cable jacket 4 was torn so that the optical-fiber cords were taken out.

(Determination of Extrusion Coating Temperature)

The melt-flow rate was measured while the temperature for heating was changed variously as the extrusion temperature of each plastic coating material under a test load of 2.16 kgf in accordance with JIS K7210. A good extrusion coating layer was obtained experimentally when the temperature to make the melt-flow rate 0.15 g was used as the extrusion coating temperature.

According to the present invention, extrusion coating temperatures for various kinds of low-density polyethylene determined in the aforementioned manner were used for producing the respective flat type optical cables extrusion-coated with both the cord jacket 3 and the cable jacket 4 in the aforementioned examples.

(Method of Measuring Young's Modulus)

Each of Young's moduli was determined on the basis of tensile stress measured at a tensile speed of 1 mm/min and at an extensibility of 2.5% in accordance with JIS K7217.

Although attention has been paid to the Young's moduli and extrusion coating temperatures of the cord jacket 3 and the cable jacket 4 in the aforementioned embodiment, the Shore durometer hardness of the cord jacket 3 may be set to be higher than that of the cable jacket 4 so that revealing for the flat type optical cable 20 can be made easily.

Particularly when the Shore durometer hardness of the cable jacket 4 is set to be in a range of from 40 degrees to 60 degrees, the revealing and laying work for the flat type optical cable can be made more easily.

According to the present invention, a combination of plastic materials is selected so that the Young's modulus of a material for forming the cable jacket of the flat type optical cable is smaller than the Young's modulus of a material for forming the cord jackets of the flat type optical cable. Hence, when the cable jacket at an end portion of the flat type optical cable is torn out in the revealing work, the cord jackets higher in Young's modulus hardly expand. Hence, the cable jacket is not damaged because it is easily peeled and separated from the cord jackets. Hence, the revealing work is made very easily.

Further, the selection of a combination of such plastic materials prevents the cord jackets of the optical-fiber cords from being damaged, because the cable jacket in a certain region expands so largely as to be destroyed and separated from the cord jackets even in the case where the cable jacket in the certain region is partially fusion-bonded to the cord jackets.

Further, according to the present invention, a combination of plastic materials is selected so that the extrusion coating temperature and Shore durometer hardness of the cable jacket are lower than those of the cord jackets are. Hence, the revealing work can be made more easily.

What is claimed is:

1. A flat type optical cable comprising:

optical fiber cords including an optical fiber coated with a cord jacket; and a cable jacket which directly coats the cord jacket so that the optical fiber cords are integrated into one optical cable;

wherein the Young's modulus of a coating material forming the cable jacket is lower than the Young's modulus of a coating material forming the cord jacket;

wherein the Young's modulus of said coating material forming said cord jacket is in a range of from 9 kg/mm² to 15 kg/mm² whereas the Young's modulus of said coating material forming said cable jacket is in a range of from 4 kg/mm² to 9 kg/mm².

2. The flat type optical cable according to claim 1, wherein an extrusion coating temperature for said cable jacket is lower by at least 10° C. than an extrusion coating temperature for said cord jacket.

3. The flat type optical cable according to claim 1, wherein hardness of said cord jacket is higher than that of said cable jacket; and the Shore durometer hardness of said cable jacket is in a range of from 40 degrees to 60 degrees.

4. The flat type optical cable according to claim 1, further comprising a plurality of an optical fiber cords, each including an optical fiber coated with a cord jacket, which are parallel arranged.

5. The flat type optical cable according to claim 1, wherein the cord jacket is comprised of plastic material.

6. The flat type optical cable according to claim 1, wherein the cable jacket is comprised of plastic material.

7. The flat type optical cable according to claim 1, wherein the optical fiber cord further includes a fibrous layer, which is longitudinally attached onto the optical-fiber, between the optical fiber and the cord jacket.

8. The flat type optical cable according to claim 1, further comprising a tensile wire.

* * * * *